(12) United States Patent
Kayama et al.

(10) Patent No.: US 6,857,415 B2
(45) Date of Patent: Feb. 22, 2005

(54) CONTROL SYSTEM FOR INTERNAL COMBUSTION ENGINE

(75) Inventors: Ryozo Kayama, Kariya (JP); Toshiki Annoura, Nagoya (JP); Koichi Hoshi, Susono (JP); Takaaki Itoh, Mishima (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/851,665

(22) Filed: May 24, 2004

(65) Prior Publication Data

US 2004/0237923 A1 Dec. 2, 2004

(30) Foreign Application Priority Data

May 22, 2003 (JP) ........................................ 2003-144935

(51) Int. Cl.[7] ............................................. F02D 13/00
(52) U.S. Cl. ....................................... 123/349; 123/704
(58) Field of Search ................................ 123/319, 349, 123/344, 704, 350, 345, 346

(56) References Cited

U.S. PATENT DOCUMENTS 4,416,230 A  * 11/1983 Katayose et al. ........... 123/325

FOREIGN PATENT DOCUMENTS

| JP | 04-134159 | 5/1992 |
| JP | 07-119511 | 5/1995 |

* cited by examiner

Primary Examiner—Bibhu Mohanty
(74) Attorney, Agent, or Firm—Nixon & Vanderhye P.C.

(57) ABSTRACT

A bypass passage for bypassing a check valve is connected with a vacuum introducing passage of a brake booster. The bypass passage is provided with a switching valve. Just before the start of an engine, the switching valve temporarily opens the bypass passage whereby to equalize a remaining pressure of the brake booster substantially becomes equal to an atmospheric level. As a result, the pressure in the brake booster at the starting time is set to substantially the atmospheric level so that the airflow to be sucked from the brake booster into the intake pipe at the starting time is made substantially contact every times. Thus, the fuel injection rate can be set considering the airflow to be sucked from the brake booster into the intake pipe at the starting time, even if that airflow cannot be detected.

8 Claims, 5 Drawing Sheets

CONTROL SYSTEM FOR INTERNAL COMBUSTION ENGINE

CROSS-REFERENCE TO RELATED APPLICATION

This application is based on Japanese Patent Application No. 2003-144935 filed on May 22, 2003, the disclosure of which is incorporated herein by reference.

FIELD OF THE INVENTION

The present invention relates to a control system for an internal combustion engine, which has an airflow meter for measuring an amount of intake air and an intake pipe vacuum type break booster.

BACKGROUND OF THE INVENTION

A conventional air/fuel control system for an internal combustion engine, as disclosed in JP-A-4-134159, is provided with an airflow meter in the intake pipe. A fuel injection amount is determined according to an amount of intake air measured by the airflow meter so that air/fuel ratio is controlled to predetermined value.

JP-A-7-119511 shows a vehicle driven by an internal combustion engine, the vehicle having a vacuum type brake booster which utilizes an intake pipe vacuum (negative pressure) created downstream of a throttle valve. The intake pipe vacuum is introduced into the vacuum type brake booster via a vacuum introducing passage connected to the intake pipe, and the pressure difference between the intake pipe vacuum and the atmosphere is utilized to amplify the depressing force of a brake pedal so as to increase the braking force of a brake.

In the vehicle having the intake pipe vacuum type brake booster mounted thereon, the intake pipe vacuum is introduced into the brake booster when the vacuum in the brake booster is reduced by a braking or the like while the internal combustion engine is running, so that the air in the brake booster is sucked into the intake pipe. However, the vacuum introducing passage of the brake booster is connected to the intake pipe downstream of the airflow meter (i.e., downstream of the throttle valve), so that the airflow to be sucked from the brake booster via the vacuum introducing passage into the intake pipe is not detected by the airflow meter. In the system for controlling the air/fuel ratio by setting the fuel injection rate on the basis of the intake airflow measures by the airflow meter, therefore, the airflow to be sucked from the brake booster into the intake pipe cannot be reflected on the air/fuel control when the intake pipe vacuum is introduced into the brake booster while the internal combustion engine is running. Therefore, the air/fuel ratio may be changed into the lean direction to lower the torque or increase the NOx emissions thereby to adversely affect the drivability or the exhaust emissions.

In JP-A-7-119511, the vacuum introducing passage of the brake booster is provided with a flow control valve for reducing the airflow to be sucked from the brake booster into the intake pipe, when it is decided on the basis of the running state (e.g., the running speed) of the vehicle that the depressing force of the brake pedal need not be amplified. Thus, the influences of the air to be sucked from the brake booster into the intake pipe are reduced to suppress the disturbances in the air/fuel ratio.

Generally, the brake booster is constructed in such a manner that the vacuum (or residual pressure) in the brake booster is kept by a check valve even after the internal combustion engine is stopped so that the pressure in the intake pipe restored the atmospheric level. If, however, the driver depresses the brake pedal while the internal combustion engine is stopped (or before the engine start), the residual pressure of the brake booster drops. Therefore, the residual pressure of the brake booster at the beginning of the engine start so seriously disperses that it may be left sufficient or substantially reduced close to the atmospheric level. When the internal combustion engine is started with the residual pressure of the brake booster being lowered, the intake pipe vacuum is introduced into the brake booster at the instant when the cranking is started to create the vacuum in the intake pipe. Then, the air in the brake booster is sucked into the intake pipe.

However, the airflow to be sucked from the brake booster into the intake pipe is not detected by the airflow meter, as described hereinbefore. In the system for controlling the air/fuel ratio by setting the fuel injection rate on the basis of the intake airflow detected by the airflow meter, therefore, the airflow to be sucked from the brake booster into the intake pipe with the engine at starting cannot be reflected on the air/fuel control. With the engine at starting, the air/fuel ratio may be changed into the lean direction by the influences of the air sucked from the brake booster into the intake pipe, to lower the torque or increase the NOx emissions thereby to adversely affect the drivability or the exhaust emissions.

As countermeasures, it is conceived that the aforementioned technique of JP-A-7-119511 is utilized to reduce the airflow to be sucked from the brake booster into the intake pipe at the starting time, by means of a flow control valve thereby to suppress the dispersion in the air/fuel ratio. However, the reduction of the airflow to be sucked from the brake booster into the intake pipe at the starting time by the flow control valve implies the retardation of the speed of introducing the intake pipe vacuum into the brake booster at the starting time. This further implies that the time period from the engine start to the restoration of the vacuum in the brake booster is elongated to make it impossible to restore the depressing force amplifying effect of the brake pedal early. Especially in case the residual pressure of the brake booster is substantially exhausted before the start, the aforementioned problems become serious if the airflow to be sucked from the brake booster into the intake pipe at the starting time is reduced by the flow control valve.

SUMMARY OF THE INVENTION

An object of the present invention is to provide a control system for an internal combustion engine, which controls the air/fuel ratio on the basis of the intake airflow amount measured by an airflow meter, and which restrict the air/fuel ratio from being changed by the influences of the air to be sucked from a brake booster into an intake pipe at a starting time, whereby the dispersions in a starting condition and the exhaust emissions are suppressed and the vacuum in the brake booster is restored early at the starting time of the engine.

According to the invention, there is provided a control system for an internal combustion engine, in which an air/fuel ratio is controlled by air/fuel ratio control means on the basis of the intake airflow amount measured by an airflow meter, and in which an intake pipe vacuum is introduced into a brake booster via a vacuum introducing passage connected to an intake pipe downstream of the airflow meter. The residual pressure of the brake booster is set to a predetermined value by brake booster residual pressure adjusting means for the time period from the stop of to just before the start of the internal combustion engine.

Thus, the residual pressure of the brake booster is set to a predetermined level (e.g., an atmospheric pressure) for the time period from the stop of the internal combustion engine to just before the start. Therefore, the residual pressure of the brake booster at the beginning of the start can be equalized every times to a constant level thereby to make such an airflow substantially constant every times as to be sucked at the starting time from the brake booster into the intake pipe. Even if the airflow to be sucked at the starting time from the brake booster into the intake pipe cannot be measured, it is possible to easily estimate how much that airflow is, and to treat the airflow as the known data. As a result, the fuel injection rate can be set by considering the airflow to be sucked from the brake booster into the intake pipe at the starting time, even if the airflow cannot be measured, so that the air/fuel ratio at the starting time can be properly controlled to suppress the dispersions in the starting condition and the exhaust emissions. Moreover, the airflow to be sucked from the brake booster into the intake pipe at the starting time need not be reduced so that the vacuum in the brake booster can be early restored at the engine starting.

The brake booster residual pressure adjusting means includes: a bypass passage for bypassing a check valve disposed in the vacuum introducing passage communicating between the intake pipe and the brake booster and a switching valve for opening/closing the bypass passage. The switching valve may be temporarily opened from the stop of to just before the start of the internal combustion engine. During the stop of the internal combustion engine, the pressure in the intake pipe is substantially equal to the atmospheric pressure. When the switching valve opens the bypass passage for the time period (that is, during the stop of the internal combustion engine) from the stop of to just before the start of the internal combustion engine, the brake booster is communicated with the intake pipe to equalize the residual pressure of the brake booster substantially to the atmospheric level. As a result, the residual pressure of the brake booster at the beginning of the start can be made substantially atmospheric every starting times so that the airflow to be sucked from the brake booster into the intake pipe at the starting time can be made substantially constant.

Alternatively, the brake booster residual pressure adjusting means may include a bypass passage for bypassing a check valve disposed in the vacuum introducing passage which communicates the intake pipe with the brake booster and an orifice for reducing the amount of airflow flowing through the bypass passage. With this construction, the air in the intake pipe can be gradually fed during the stop of the internal combustion engine through the orifice of the bypass passage into the brake booster thereby to lower the residual pressure gradually, so that the residual pressure of the brake booster can be set substantially to the atmospheric pressure (i.e., the pressure equal to the intake pipe) during the stop of the internal combustion engine. As a result, the residual pressure of the brake booster at the beginning of the start can be made substantially atmospheric every times so that the airflow to be sucked from the brake booster into the intake pipe at the starting time can be made substantially constant every times.

On the other hand, the control system may further comprise suction airflow information detecting means for detecting the information (as will be called the "suction airflow information") on the air flow to be sucked from the brake booster into the intake pipe, so that a fuel injection rate may be set on the basis of an intake airflow detected at the starting time of the internal combustion engine by the airflow meter and the suction airflow information detected by the suction airflow information detecting means. The amount of airflow to be sucked from the brake booster into the intake pipe at the engine starting can be actually measured even if it disperses. Therefore, the fuel injection rate according to the airflow (i.e., the total of the airflow having passed through the airflow meter and the airflow to be sucked from the brake booster into the intake pipe) to be actually sucked into the individual cylinders of the internal combustion engine at the engine starting can be set to control the air/fuel ratio properly at the engine starting thereby to suppress the dispersions in the starting condition and the emissions. In this case, too, it is unnecessary to reduce the airflow to be sucked from the brake booster into the intake pipe at the starting time. Therefore, the vacuum in the brake booster can be early restored with the engine at starting.

DESCRIPTION OF THE PREFERRED EMBODIMENTS (First Embodiment)

Figure 1:
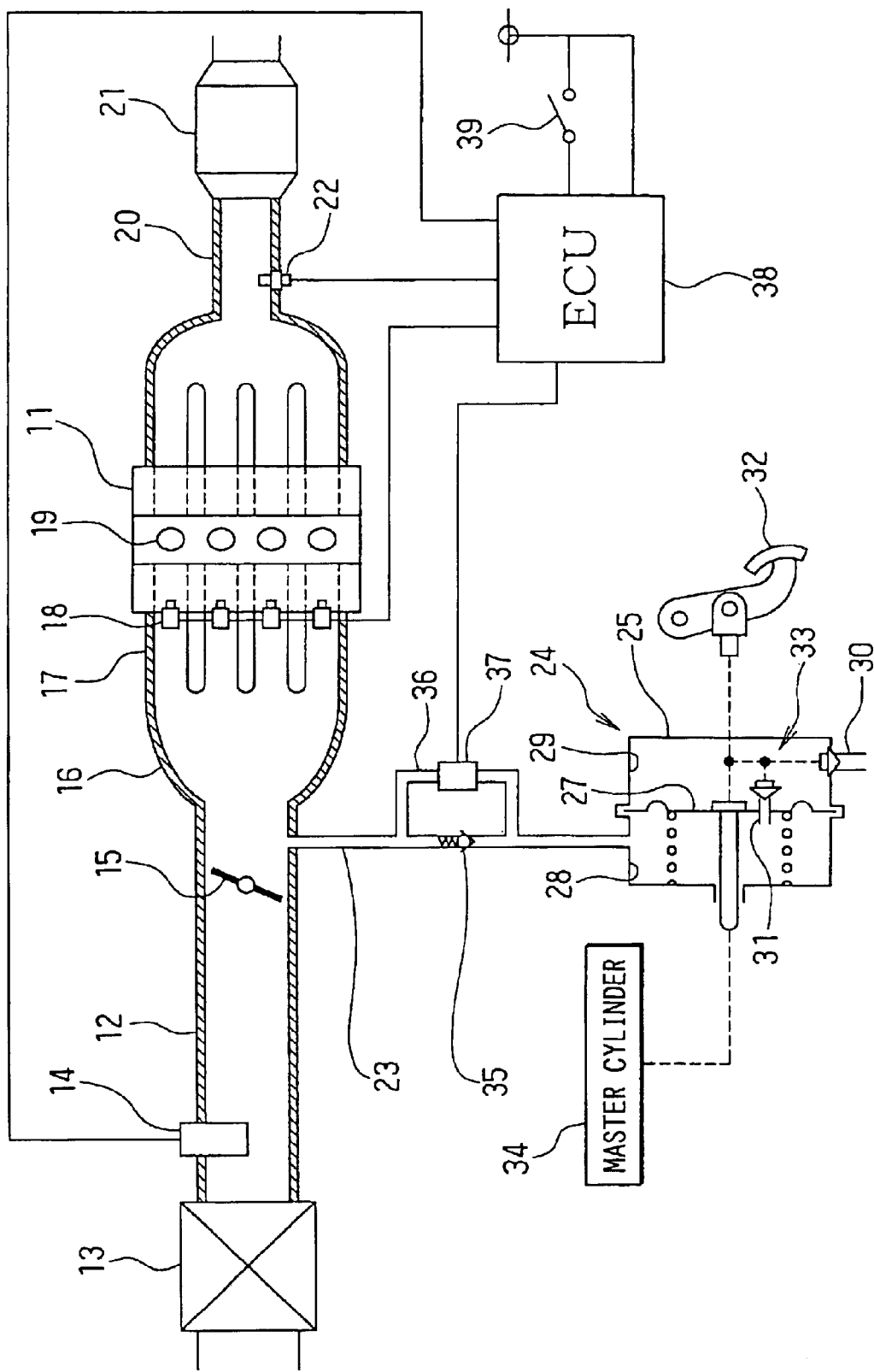
FIG. 1 is a schematic construction diagram showing the entirety of an engine control system according to a first embodiment of the invention.
Figure 2:
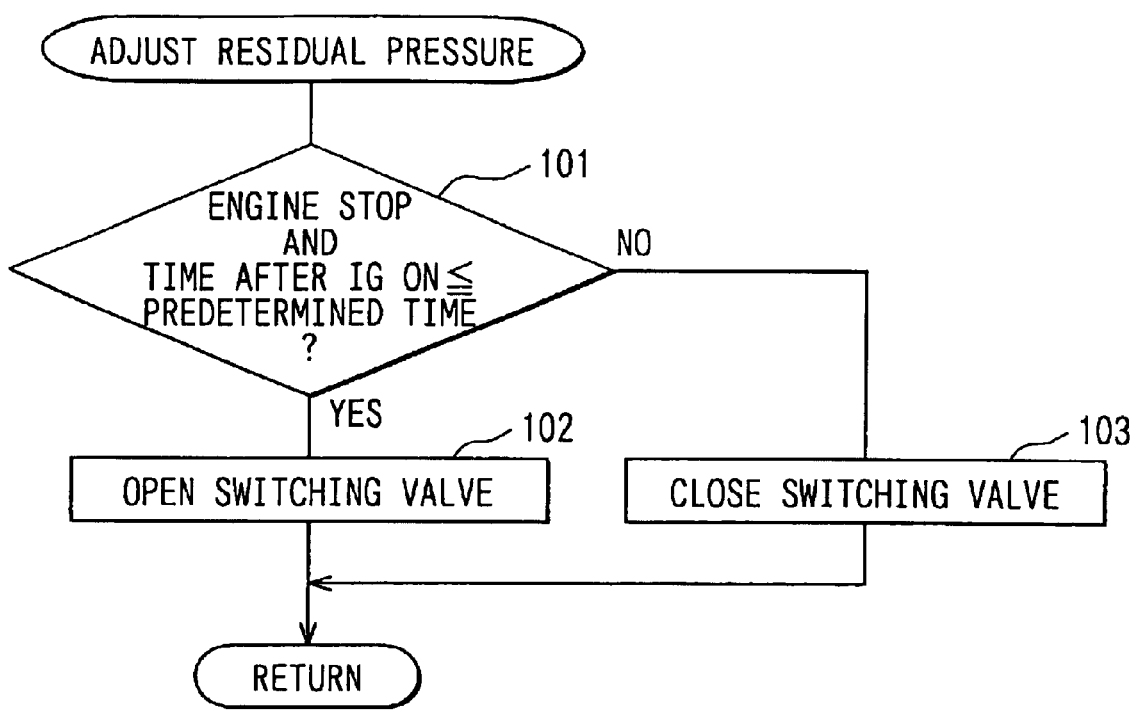
FIG. 2 is a flow chart showing a processing flow of a brake booster residual pressure-adjusting program with an engine at starting.

Referring to FIG. 1 and FIG. 2, a first embodiment of the invention is described herein after. FIG. 1 shows a schematic construction of an engine control system. At the most upstream of an intake pipe 12 of an internal combustion engine or an engine 11, an air cleaner 13 is disposed, downstream of which an airflow meter 14 is disposed for detecting an intake airflow. Downstream of the airflow meter 14, a throttle valve 15 is disposed, an opening of which is controlled by a DC motor or the like.

A surge tank 16 is disposed downstream of the throttle valve 15, which is provided with an intake manifold 17 for introducing the air into the individual cylinders of the engine 11. To the vicinities of the intake ports of the intake manifold 17 for the individual cylinders, fuel injection valves 18 are disposed individually. Ignition plugs 19 are provided in the cylinder head for the individual cylinders so that the air/fuel mixtures in the cylinders are ignited with the spark discharges of the individual ignition plugs 19.

On the other hand, the engine 11 has an exhaust pipe 20 provided with a catalyst 21 such as a three-way catalyst for cleaning CO, HC, NOx and so on in the exhaust gas. Upstream of the catalyst 21, an exhaust gas sensor 22 (e.g., an air/fuel ratio sensor or an oxygen sensor) is disposed for detecting the air/fuel ratio or the richness/leanness of the exhaust gas.

A brake booster 24 is connected to the intake pipe 12 downstream of the throttle valve 15 through a vacuum introducing passage 23. The brake booster 24 has its casing 25 partitioned into a vacuum chamber 28 and an atmospheric chamber 29 by a power piston 27. The vacuum introducing passage 23 is connected to the vacuum chamber 28, and an atmosphere communication chamber 30 is connected to the atmospheric chamber 29. Moreover, the power piston 27 is provided with an internal communication passage 31 for providing communication between the vacuum chamber 28 and the atmospheric chamber 29. In the casing 25 of the brake booster 24, there is disposed a switching mechanism 33 for switching the internal communication passage 31 and the atmosphere communication chamber 30 in response to a brake pedal 32.

This switching mechanism 33 acts in the following manners. When the brake pedal 32 is not depressed, the internal communication passage 31 is opened to provide communication between the vacuum chamber 28 and the atmospheric chamber 29, and the atmosphere communication passage 30 is closed to stop the communication between the atmospheric chamber 29 and the atmosphere. As a result, the intake pipe vacuum is introduced via the vacuum introducing passage 23 into the vacuum chamber 28 and the atmospheric chamber 29 while the engine is running.

After this, when the brake pedal 32 is depressed, the internal communication passage 31 is closed to stop the communication between the vacuum chamber 28 and the atmospheric chamber 29, and the atmosphere communication passage 30 is opened to vent the atmospheric chamber 29 to the atmosphere. As a result, the atmospheric pressure is introduced into the atmospheric chamber 29 while the vacuum in the vacuum chamber 28 being kept, so that a pressure difference is established between the two sides of the power piston 27. This pressure difference amplifies the depressing force of the brake pedal 32, and this amplified depressing force is transmitted to a master cylinder 34 so that the braking force of the brake (not-shown) is raised.

After this, when the brake pedal 32 is released, the internal communication passage 31 is opened to restore the communication between the vacuum chamber 28 and the atmospheric chamber 29, and the atmosphere communication passage 30 is closed to stop the communication between the atmospheric chamber 29 and the atmosphere. As a result, the vacuum in the brake booster 24 (i.e., the vacuum chamber 28 and the atmospheric chamber 29) is lowered to the extent that the atmospheric pressure is introduced into the atmospheric chamber 29 when the brake pedal 32 is depressed. Therefore, the intake pipe vacuum is introduced into the brake booster 24, and the air in the brake booster 24 is sucked during the introduction procedure into the intake pipe 12.

In the vacuum introducing passage 23, a check valve 35 is disposed, which is opened to introduce the intake pipe vacuum into the vacuum chamber 28 (that is, the air in the brake booster 24 is sucked into the intake pipe 12), when the intake pipe vacuum is higher than the residual pressure of the brake booster 24 (i.e., the vacuum of the vacuum chamber 28). When the intake pipe vacuum is lower than the residual pressure of the brake booster 24 (i.e., the vacuum of the vacuum chamber 28), the check valve 35 is closed to keep the residual pressure of the brake booster 24.

A bypass passage 36 is connected to the vacuum introducing passage 23 for communicating between the intake pipe 12 and the vacuum chamber 28 with bypassing the check valve 35. A switching valve 37 for opening/closing the bypass passage 36 is disposed in the bypass passage 36. The switching valve 37 is a normally closed type solenoid valve, for example, which opens the bypass passage 36, when turned ON, to. A brake booster residual pressure adjusting means is comprised of the bypass passage 36 and switching valve 37, which executes a starting time brake booster residual pressure-adjusting program shown in FIG. 2.

The outputs of various sensors such as the airflow meter 14 are inputted to an engine control unit (as will be expressed as the "ECU") 38. The ON/OFF signal of an ignition switch (as will be expressed as the "IG switch") 39 is inputted to the SW terminal of the ECU 38. When the IG switch 39 is turned ON, the power supply to the ECU 38 is started, and when this IG switch 39 is turned OFF, the power supply to the ECU 38 and so on is interrupted.

The ECU 38 mainly includes a microcomputer, and executes the various engine control programs, which are stored in a packaged ROM (or storage medium), to control the fuel injection rates of the fuel injection valves 18 and the ignition timings of the ignition plugs 19 in accordance with the engine running condition. At this time, the ECU 38 executes the not-shown air/fuel ratio control program so that it functions as air/fuel ratio control means for controlling the air/fuel ratio by setting the fuel injection rates on the basis of the intake airflows measured by the airflow meter 14.

Moreover, the ECU 38 executes the later-described starting time brake booster residual pressure-adjusting program of FIG. 2. By this execution, the switching valve 37 of the bypass passage 36 is temporarily opened just before the start of the engine 11 thereby to open the bypass passage 36 so that the communication between the intake pipe 12 and the brake booster 24 is established to equalize the residual pressure in the brake booster 24 (i.e., the vacuum chamber 28 and the atmospheric chamber 29) substantially to an atmospheric pressure (i.e., the pressure in the intake pipe 12). As a result, the residual pressure of the brake booster 24 with the engine at starting is equalized every times substantially to the atmospheric level thereby to make such an airflow substantially constant every times as to be sucked at the starting time from the brake booster 24 into the intake pipe 12. Even if the airflow to be sucked at the starting time from the brake booster 24 into the intake pipe 12 is not detected, it is possible to easily estimate how much that airflow is, and to treat the airflow as the known data.

The starting time brake booster residual pressure-adjusting program shown in FIG. 2 is executed every predetermined period after the IG switch 39 is turned ON. When the program is started, first of all, it is determined in Step 101 whether or not the engine is stopped (before the starter is ON) and whether or not the elapsed time period after the IG switch 39 is turned ON is within a predetermined value.

When it is decided that the engine is stopped and that the elapsed time period after the IG switch 39 is turned ON is within the predetermined value, the routine advances to Step 102, in which the switching valve 37 of the bypass passage 36 opens the bypass passage 36. As a result, the communication between the intake pipe 12 and the brake booster 24 is established to equalize the residual pressure of the brake booster 24 substantially to the atmospheric pressure (i.e., the pressure in the intake pipe 12).

Then, when it is determined in Step 101 that the engine is running (after ON of the starter) or when the elapsed time period after the IG switch 39 is ON is over the predetermined value, the routine advances to Step 103, at which the switching valve 37 of the bypass passage 36 closes the bypass passage 36. As a result, while the engine is running, each time the intake pipe pressure becomes higher than the residual pressure of the brake booster 24 (i.e., the pressure in the vacuum chamber 28), the check valve 35 is opened to introduce the intake pipe vacuum into the brake booster 24.

In this procedure, the air in the brake booster 24 is sucked into the intake pipe 12. When the intake pipe vacuum becomes lower than the residual pressure of the brake booster 24, moreover, the check valve 35 is closed to keep the residual pressure of the brake booster 24.

In the first embodiment, just before the engine starts (for the time period from ON of the IG switch 39 to ON of the starter), the switching valve 37 of the bypass passage 36 temporarily opens the bypass passage 36. Just before the engine start, therefore, the communication between the intake pipe 12 and the brake booster 24 is established to equalize the residual pressure of the brake booster 24 substantially to the atmospheric pressure (i.e., the pressure in the intake pipe 12). As a result, the residual pressure of the brake booster 24 at the beginning of the start can be made substantially atmospheric every times so that the airflow to be sucked from the brake booster 24 into the intake pipe 12 at the starting time can be made substantially constant every times. Even if the airflow to be sucked from the brake booster 24 into the intake pipe 12 at the starting time is not detected by the airflow meter 14, it is possible to easily estimate how much that airflow and to treat the airflow as the known data. As a result, the fuel injection rate can be set by considering the airflow to be sucked from the brake booster 24 into the intake pipe 12 at the starting time, even if the airflow cannot be detected, so that the air/fuel ratio at the starting time can be properly controlled. As a result, the air/fuel ratio can be restricted from being changed by the influence of the air to be sucked from the brake booster 24 into the intake pipe 12 at the starting time, so that the dispersions in the start condition and the exhaust emissions can be suppressed.

Moreover, the airflow to be sucked from the brake booster 24 into the intake pipe 12 at the starting time need not be reduced so that the vacuum in the brake booster 24 can be early restored to restore the depressing force of the brake pedal 32 early.

In the first embodiment, the switching valve 37 is opened just before the engine start (i.e. during the time period from the IG switch ON to the starter ON), but may also be opened either just after of the engine stop or after lapse of a predetermined time period from the engine stop. Alternatively, the switching valve 37 may also be opened a plurality of times for the time period from the engine stop to just before the engine start.

Moreover, the check valve 35, the bypass passage 36, the switching valve 37 and the like may also be integrated into a module. Alternatively, the valve member of the check valve 35 may also be opened/closed by an actuator such as a solenoid so that the check valve 35 may act as a switching valve, too.

(Second Embodiment)

Figure 3:
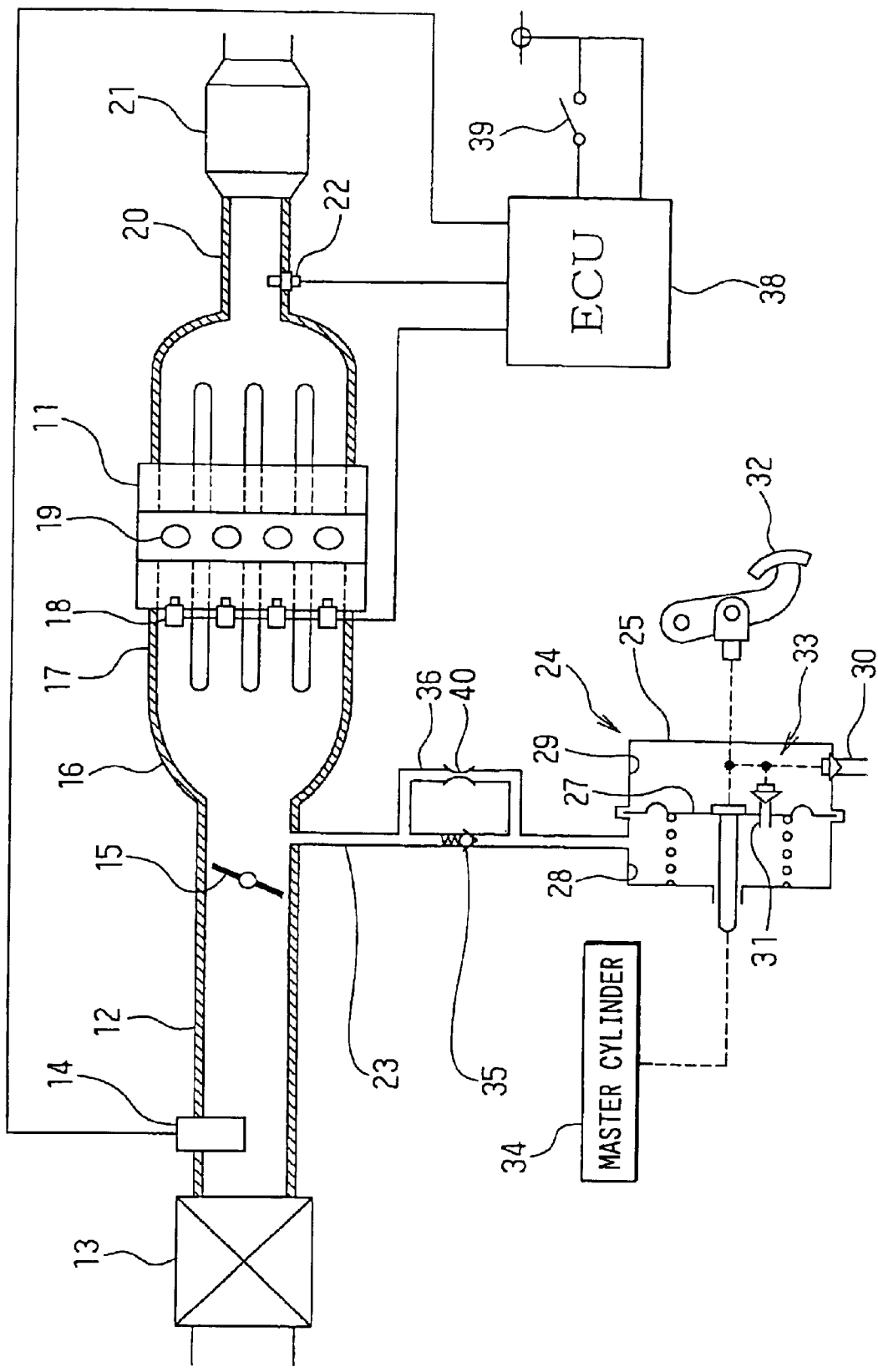
FIG. 3 is a schematic construction diagram showing the entirety of an engine control system according to a second embodiment.

The switching valve 37 is disposed in the bypass passage 36 in the first embodiment. In second embodiment shown in FIG. 3, an orifice 40 is provided in place of the switching valve 37 in the bypass passage 36. The orifice 40 has a far smaller passage diameter than that of the remaining portion of the bypass passage 36. As a result, the airflow through the bypass passage 36 can be reduced to such a low rate as can be ignored while the engine is running. A bake booster residual pressure adjusting means is comprised of bypass passage 36 and orifice 40. The remaining system constructions are identical to those of the first embodiment.

The orifice 40 is disposed in the bypass passage 36. Therefore, the air in the intake pipe 12 can be gradually introduced into the brake booster 24 through the orifice 40 during the engine stop so that the residual pressure of the brake booster 24 can be set substantially to the atmospheric pressure (i.e., the pressure equal to the intake pipe 12) during the engine stop. As a result, the residual pressure of the brake booster 24 at the beginning of the start can be made substantially atmospheric every times so that the airflow to be sucked from the brake booster 24 into the intake pipe 12 at the starting time can be made substantially constant every times. Thus, in the second embodiment, the same effects can achieve as those of the first embodiment.

The check valve 35, the bypass passage 36, the orifice 40 and so on may also be integrated into a module.

(Third Embodiment)

Figure 4:
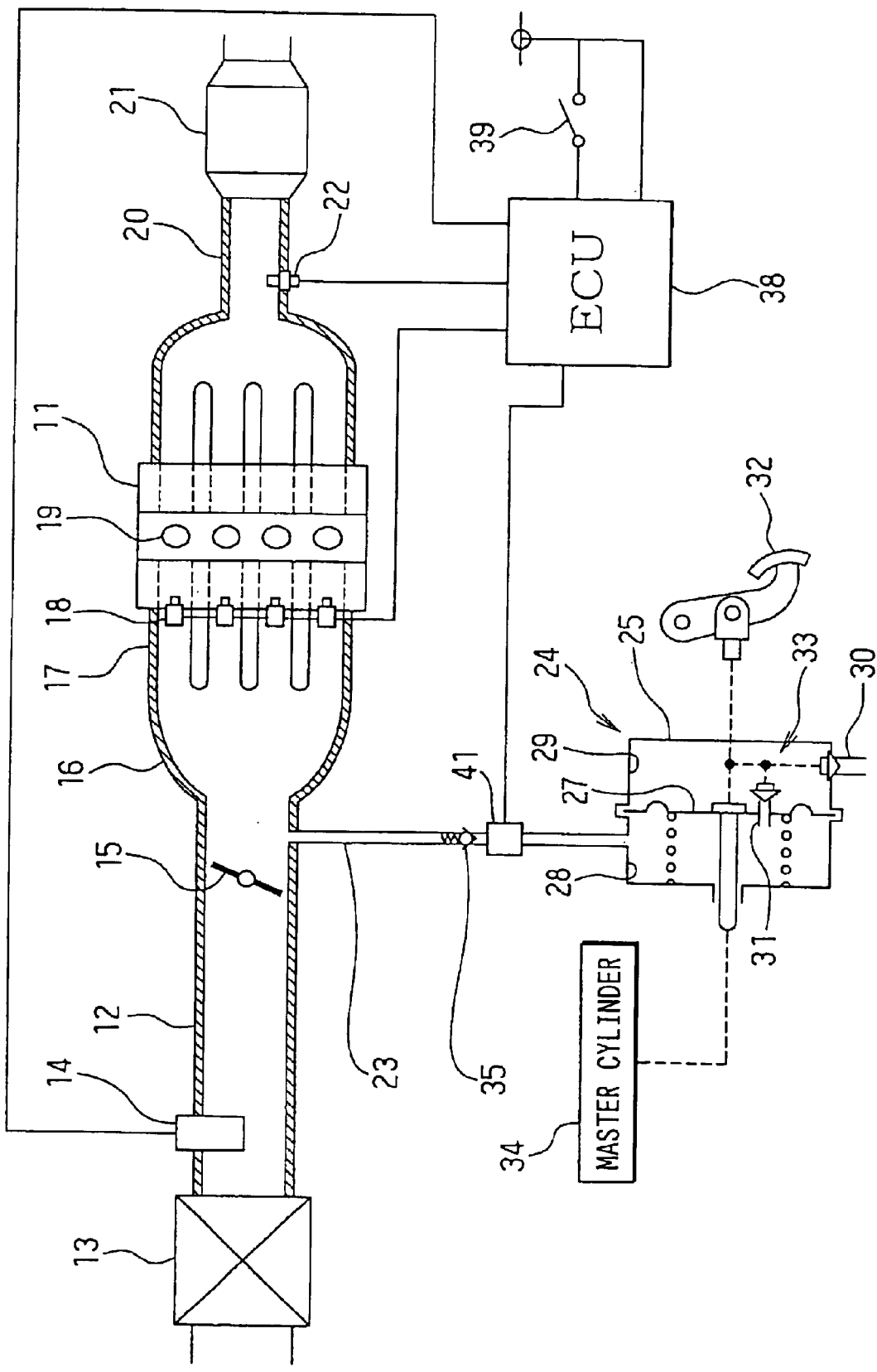
FIG. 4 is a schematic construction diagram showing the entirety of an engine control system according to a third embodiment.

A third embodiment of the invention will be described with reference to FIG. 4 and FIG. 5. In the third embodiment as shown in Fig. a pressure sensor 41 (i.e., suction airflow information detecting means) is disposed between the check valve 35 and the brake booster 24 in the vacuum introducing passage 23. The pressure (corresponding to the residual pressure of the brake booster 24) in the vacuum introducing passage 23 is detected by that pressure sensor 41 thereby to detect the information on the airflow to be sucked from the brake booster 24 into the intake pipe 12 at the starting time. The remaining system constructions are identical to those of the first embodiment.

Figure 5:
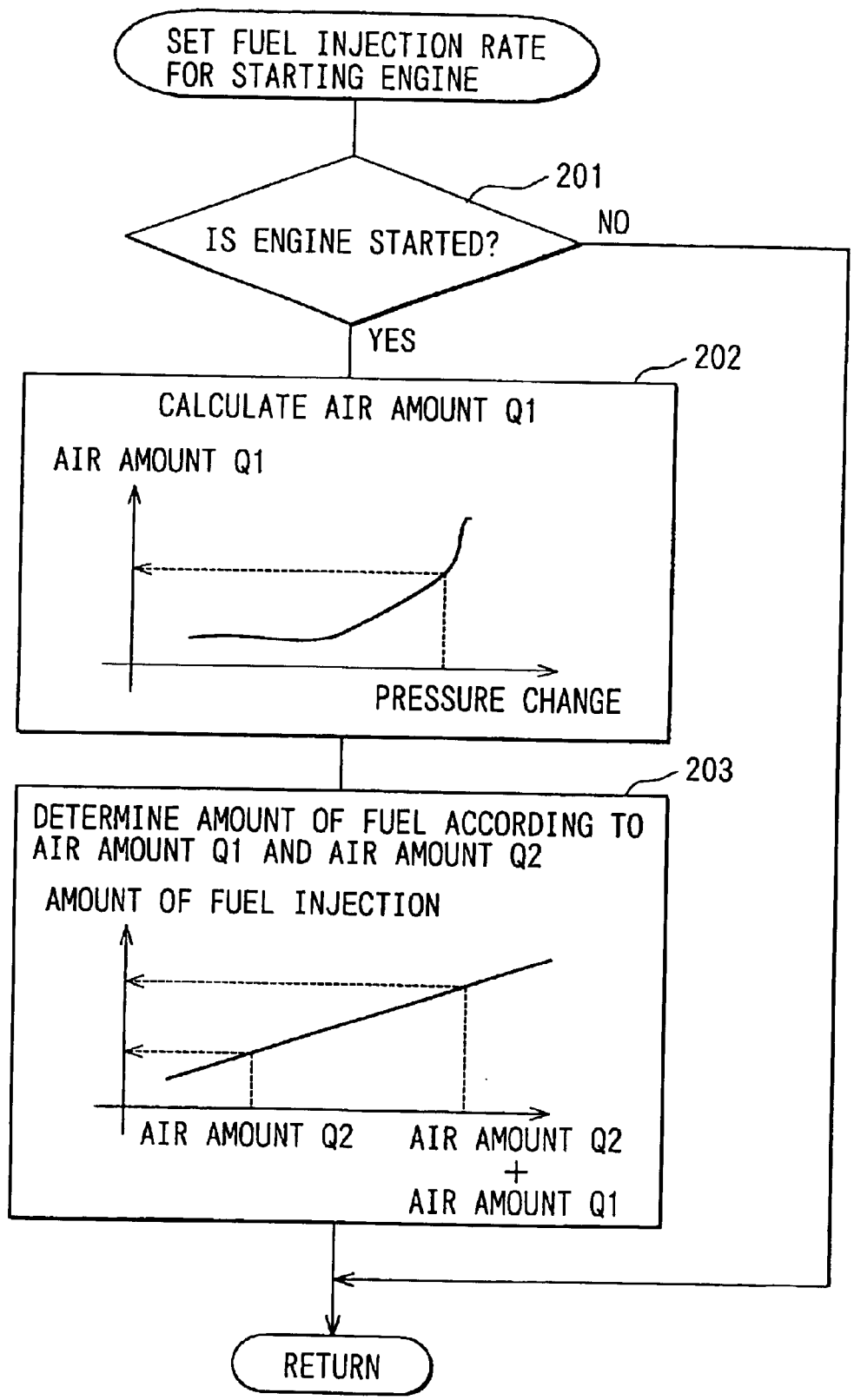
FIG. 5 is a flow chart showing the processing flow of a fuel injection rate-setting program with an engine at starting.

In the third embodiment, moreover, the starting time fuel injection rate setting program shown in FIG. 5 is executed. At the engine starting time, the airflow Q1 to be sucked from the brake booster 24 into the intake pipe 12 is calculated on the basis of the pressure (corresponding to the residual pressure in the brake booster 24) in the vacuum introducing passage 23, the pressure being detected by the pressure sensor 41. The fuel injection rate is calculated on the basis of the total amount of that airflow Q1 and an intake airflow Q2 detected by the airflow meter 14. The total amount of airflow Q1 and Q2 corresponds to the amount of airflow actually sucked into the individual cylinders of the engine 11.

The starting time fuel injection rate setting program shown in FIG. 5 is executed every predetermined periods after the IG switch 39 was turned ON. When this program is started, it is determined whether or not the engine is at starting in Step 201, for example, in terms of whether or not the elapsed time period after ON of the IG switch 39 is within a predetermined value, whether or not the engine speed is within a predetermined value, or the like. When it is determined that the engine is not at starting, this program is ended without executing the operations at and after Step 202.

When it is determined that the engine is at starting, the routine advances to Step 202 in which the airflow Q1 to be sucked from the brake booster 24 into the intake pipe 12 is calculated by means of a map and the like on the basis of the pressure change (corresponding to the pressure change in the brake booster 24) in the vacuum introducing passage 23, the pressure change being detected by the pressure sensor 41.

Then, the routine advances to Step 203 in which the fuel injection rate is calculated by means of a map and the like in accordance with the total (i.e., the air flow to be actually sucked into the individual cylinders of the engine 11) of the airflow Q1 to be sucked from the brake booster 24 into the intake pipe 12 and the intake airflow Q2 detected by the airflow meter 14.

In the third embodiment as described above, at the engine starting time, the airflow Q1 to be sucked from the brake booster 24 into the intake pipe 12 is calculated on the value detected by the pressure sensor 41, and the fuel injection rate is calculated on the basis of the total of airflow Q1 and the intake airflow Q2 detected by the airflow meter 14. Therefore, the fuel injection rate according to the airflow (i.e., the total of the airflow having passed through the airflow meter 14 and the airflow to be sucked from the brake booster 24 into the intake pipe 12) to be actually sucked into the individual cylinders of the engine 11 at the starting time can be set to control the air/fuel ratio at the starting time properly thereby to suppress the dispersions in the start condition and the exhaust emissions. In this case, too, it is unnecessary to reduce the airflow to be sucked from the brake booster 24 into the intake pipe 12 at the starting time. Therefore, the vacuum in the brake booster 24 can be early restored to recover the depressing force amplifying effect of the brake pedal 32 early.

In the third embodiment, the airflow to be sucked from the brake booster 24 into the intake pipe 12 is calculated on the basis of the pressure (corresponding to the residual pressure in the brake booster 24) in the vacuum introducing passage 23, the pressure being detected by the pressure sensor 41. A sensor for detecting the airflow to flow in the vacuum introducing passage 23 may be provided to directly detect the airflow to be sucked from the brake booster 24 into the intake pipe 12.

What is claimed is:

1. A control system for an internal combustion engine, comprising:

an airflow meter for measuring an amount of an intake airflow which flows through the intake pipe of an internal combustion engine;

an air/fuel ratio control means for controlling an air/fuel ratio on the basis of the amount of the intake airflow detected by the airflow meter;

a brake booster into which an intake pipe vacuum is introduced via a vacuum introducing passage connected to the intake pipe downstream of the airflow meter; and a brake booster residual pressure adjusting means for setting the residual pressure of the brake booster to a predetermined value for the time period from a stop of the internal combustion engine to a start of the internal combustion engine.

2. The control system for an internal combustion engine according to claim 1, wherein the brake booster residual pressure adjusting means includes a bypass passage for bypassing a check valve disposed in said vacuum introducing passage to establish a communication between the intake pipe and the brake booster, and a switching valve for opening/closing the bypass passage, the switching valve being temporarily opened from the stop of the internal combustion engine to before the start of the internal combustion engine.

3. The control system for an internal combustion engine according to claim 1, wherein the brake booster residual pressure adjusting means includes a bypass passage for bypassing a check valve disposed in the vacuum introducing passage to establish a communication between the intake pipe and the brake booster, and an orifice for reducing the airflow through the bypass passage.

4. A control system for an internal combustion engine, comprising:

an airflow meter for measuring an amount of an intake airflow which flows through an intake pipe of the internal combustion engine;

am air/fuel ratio control means for controlling an air/fuel ratio on the basis of the intake airflow measured by the airflow meter;

a brake booster into which an intake pipe vacuum is introduced via a vacuum introducing passage connected to the intake pipe downstream of the airflow meter; and a suction airflow information detecting means for detecting the information on the airflow to be sucked from the brake booster into the intake pipe, wherein the air/fuel ratio control means sets a fuel injection rate on the basis of an intake airflow detected at the starting time of the internal combustion engine by the airflow meter and the suction airflow information detected by said suction airflow information detecting means.

5. The control system for an internal combustion engine according to claim 1, further comprising:

a throttle valve disposed in the intake pipe downstream of the airflow meter, wherein the vacuum introducing passage is connected to the intake pipe downstream of the throttle valve.

6. The control system for an internal combustion engine according to claim 1, further comprising:

a fuel injector individually disposed at each cylinder of the internal combustion engine, wherein the air/fuel ratio control means controls an amount of fuel injected by the fuel injector.

7. The control system for an internal combustion engine according to claim 1, further comprising:

an exhaust gas sensor for detecting the air/fuel ratio, a signal therefrom being inputted into the air/fuel ration control means.

8. The control system for an internal combustion engine according to claim 1, wherein the brake booster has an atmospheric chamber and vacuum chamber into which the intake pipe vacuum is introduced through the vacuum introducing passage.

* * * * *